INVENTORS
RANDALL S. JOHNSON
VAUGHN R. IMLER

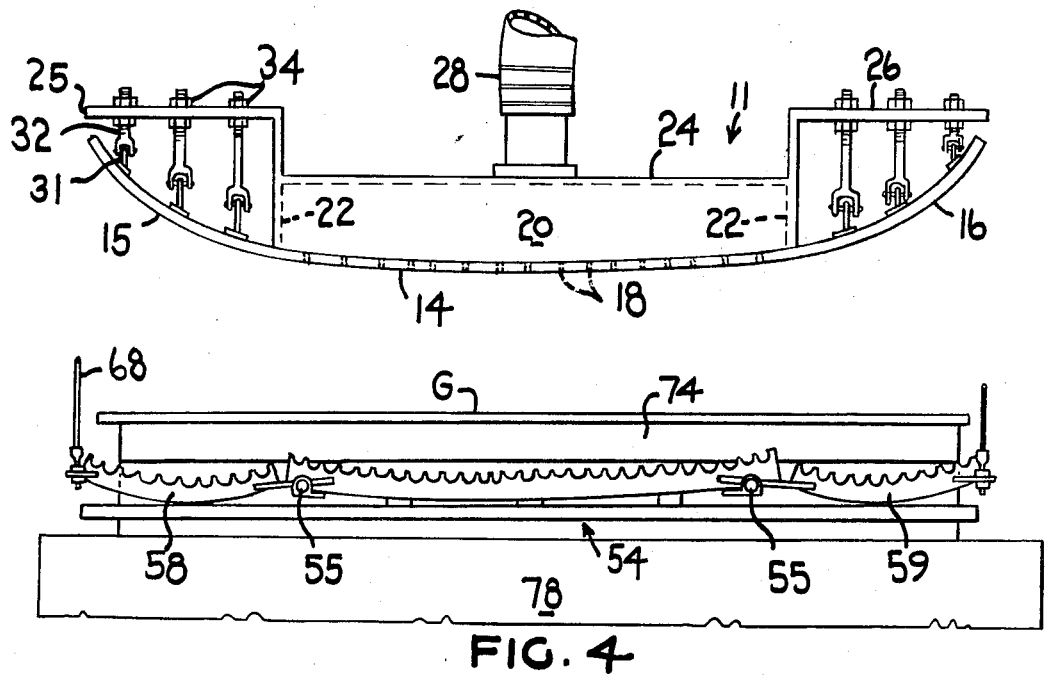
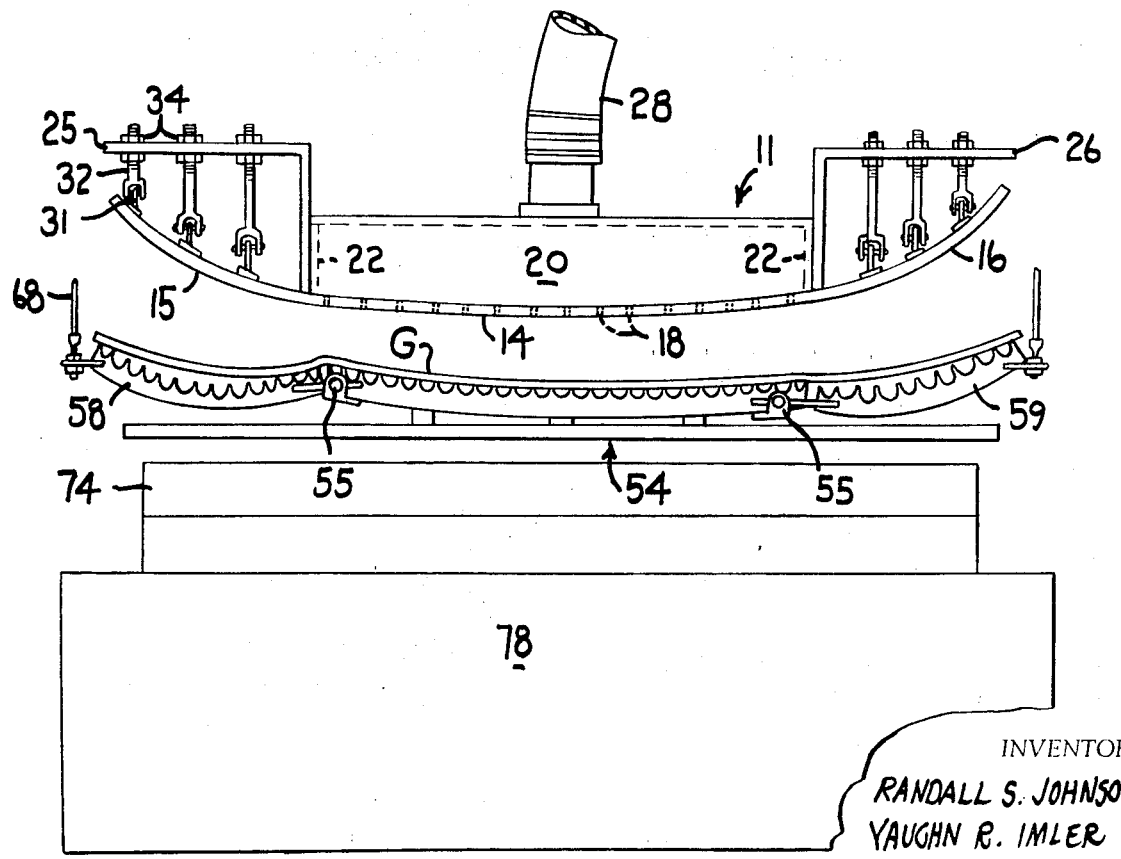
FIG. 4
FIG. 5

United States Patent Office 3,682,613
Patented Aug. 8, 1972

3,682,613
APPARATUS FOR PRESS BENDING GLASS SHEETS
Randall Scott Johnson, Hollidaysburg, and Vaughn Roger Imler, Claysburg, Pa., assignors to PPG Industries, Inc., Pittsburgh, Pa.
Filed Oct. 15, 1970, Ser. No. 80,916
Int. Cl. C03b 23/02
U.S. Cl. 65—289
10 Claims

ABSTRACT OF THE DISCLOSURE

Apparatus for bending glass sheets into nonuniform curvatures including a region of shallow curvature and at least one sharply bent region comprising a mold having an apertured shaping wall comprising a portion of shallow curvature, a closed chamber behind said portion of relatively shallow curvature and one or more sharply bent portions adjustable in shape to conform to one or more sharply bent regions to be impressed into the glass sheet.

BACKGROUND OF THE INVENTION

This invention relates to the shaping of glass sheets and particularly though not exclusively, to the shaping of glass by vacuum forming into sheets of nonuniform curvatures. These sheets include a region of relatively shallow curvature and one or more sharply bent regions.

Glass sheets have been bent and tempered to form various configurations, particularly for automobile windows, such as rear-quarter windows for station wagons and backlights, by a gravity sag technique in which glass sheets are supported on a mold of outline configuration and heated to the glass deformation temperature until the glass conforms to the outline mold, and then the bent glass is chilled while still supported on the outline mold. A typical mold used to fabricate rear quarter lights of station wagons that have a relatively flat main portion and a sharply curved end portion is shown in U.S. Pat. No. 3,220,821 to James S. Golightly. A typical mold and tempering apparatus for fabricating automobile backlights that have a main central portion of relatively gentle curvature merging into the longitudinal end portions of relatively sharp curvature is disclosed in U.S. Pat. No. 3,264,078 to George W. Stilley and James H. Cypher.

Gravity sag bending produces glass sheets of the type disclosed in the aforesaid Golightly and Stilley and Cypher patents produces glass sheets that conform quite closely to the desired curvature in the marginal portion. However, the intermediate part of the glass sheets so bent is characterized by uncontrolled sagging. Hence, the glass bending art turned to press bending prior to the sudden chilling to eliminate undesired cross sagging.

In press bending, as depicted in U.S. Pat. No. 3,333,935 to Clement E. Valchar and Stanley J. Mrozinski and U.S. Pat. No. 3,512,953 to Michael P. Roseman, glass sheets are suspended vertically by tongs during their heating, shaping and cooling. Vertical orientation of heat-softened glass reduces its tendency to develop unwanted sag, but at the expense of introducing tong marks at the points of suspension. Hence, various techniques, such as the one disclosed in the aforesaid Roseman patent, have been developed to minimize the marking of the tongs on the glass sheets. Improved tong structures, such as those disclosed in U.S. Pat. No. 3,089,727 to William J. Hay, Jr., reduce the harmful effects of the tongs on the optical properties of the glass, but do not eliminate tong marks completely.

More recently, the glass shaping art has developed a concept of vacuum forming. The vacuum forming process does not require the use of tongs. Hence, tong marks are eliminated completely from glass sheets formed by the vacuum forming process.

Apparatus for vacuum forming hot glass sheets is disclosed in U.S. Pat. No. 3,468,645 to Harold A. McMaster et al. In this patent, glass sheets are heated to a deformation temperature while supported on a layer of hot gas supplied through a porous ceramic bed over which glass sheets travel. The bed extends into a shaping station where a ring-type mold moves upward from a lowered position within a circumferential recess in the upper surface portion of the ceramic bed through which the gas layer is applied to an upward, glass sheet engaging position.

As the ring-type mold moves upward, it lifts the heat softened glass into engagement with a porous mold having an enclosed chamber directly thereabove. The hot glass is sandwiched in pressurized engagement between a downward facing shaping wall of the upper mold and the upward facing outline surface of the ring-type mold to impress the shape of the upper mold into the heat softened glass sheet. The chamber behind the apertured upper mold is evacuated to insure that the glass sheet does not sag in its inner portion unsupported by the lower ring mold. A transfer carriage removes the bent glass from the ring mold, the ring mold is then lowered and the bent glass is transferred immediately while supported on carriage elements to a cooling station. This apparatus is limited in capability to bending glass sheets into configurations of substantially uniform shallow curvatures.

SUMMARY OF THE INVENTION

The present invention particularly relates to improving the vacuum pressing technique of the aforesaid McMaster et al. patent to produce glass sheets shaped to nonuniform curvatures including regions much more sharply bent than possible with the prior art apparatus. However, in its more general application, it can be used to improve other glass bending techniques involving press bending where the treated glass sheet is oriented in vertical or oblique orientations as well as in a horizontal orientation.

According to the present invention, a mold is used that has an outwardly facing shaping wall having an apertured portion of shallow curvature, and one or more sharply bent portions conforming to the shape desired for the different regions of a heat softened glass sheet after the latter has been bent. A vacuum chamber is provided behind the wall in the region of shallow curvature only so that the chamber may be evacuated through the apertures in the portion of the shaping wall that has a shallow curvature so that the application of vacuum supports the shallow region of the hot glass sheet against gravity sagging. The shaping wall is reinforced by relatively rigid reinforcing means connected to said shaping wall. The shaping wall is more rigid than a heat softened glass sheet and is more flexible than the rigid reinforcing means.

Spaced connecting members, adjustable in length, interconnect spaced localized portions of the sharply bent portion of the shaping wall to the rigid reinforcing means. When the length of each connecting member is adjusted, it adjusts the shape of a thus interconnected localized portion of the sharply bent portion of the shaping wall. Such adjustment has previously been provided throughout the entire extent of a press bending mold in U.S. Pat. No. 3,367,764 to Samuel L. Seymour.

The present invention is especially suitable for producing so-called J-bends, which are used as the rear quarter windows of station wagons where the sharply bent region is disposed adjacent one longitudinal end of the shaped sheets. The present invention is also suitable for use in making tempered backlights for automobiles which have sharply bent end portions at each longitudinal extremity thereof.

The present invention provides the following benefits not available in prior art vacuum pressing apparatus. First, the present apparatus requires a smaller vacuum pump than the prior art, because it requires evacuation only of the portion of the mold that engages a region of the glass sheet that is likely to develop cross sag during the shaping operation, namely, the gently bent region only. In addition, the present invention provides means for readily adjusting the critical portion of the mold that engage the regions of the glass sheet that are to be bent to relatively sharp curvatures. These latter regions are very critical and a slight deviation from the desired bend in these critical regions of relatively sharp curvature results in a deviation outside of tolerance limits established by the customer. On the other hand, a variation of bend of the same magnitude in the gently bent region of the glass sheet would not necessarily involve a deviation outside of said tolerance limits.

DESCRIPTION OF THE PRIOR ART

U.S. Pat. No. 3,468,645 to Harold A. McMaster et al., discloses a vacuum forming apparatus comprising an upper aperture mold and a lower ring-type mold. This reference suggests for example, "A vacuum may be applied in the passages 86 to urge the surface of the glass sheet against the convex mold 42 as it is being curved to conform the glass sheet to the shape of the mold 42." The drawings show that the passages 86 are disposed throughout the extent of the mold in this reference.

French Pat. No. 1,316,685 to Saint-Gobain discloses a convex apertured mold having an apertured pressure box 5 behind a portion only of the shaping surface. When the air box 5 is pressurized, removal of the bent glass sheet from engagement with the mold is facilitated by escape of the pressurized air through the apertures of the pressure box against the bent glass.

U.S. Pat. No. 3,367,764 to Samuel L. Seymour discloses a press bending mold comprising a relatively flexible, solid, continuous metal plate, a relatively rigid member located in spaced relation behind and in facing relation to said relatively flexible metal plate and attachment means comprising a plurality of attachment members distributed in spaced relation throughout the areal extent of said relatively flexible metal plate and said relatively rigid member for connecting said plate and said member in spaced relation to one another, said attachment members being individually adjustable in length between said relatively flexible metal plate and said relatively rigid member for altering the shape of said relatively flexible metal plate relative to said relatively rigid member.

The present invention will be understood more readily in the light of a description of certain preferred illustrative embodiments that follow.

DESCRIPTION OF THE DRAWINGS

In the drawings that form part of the description of preferred embodiments of the present invention, wherein like reference characters are applied to like structural elements.

FIGS. 4 to 7 are schematic elevational views taken from the observation point of FG. 1, and depicting the relative positions of certain structural elements of the apparatus embodying the present invention during successive phases of a bending cycle.

DESCRIPTION OF PREFERRED EMBODIMENTS

Figure 1:
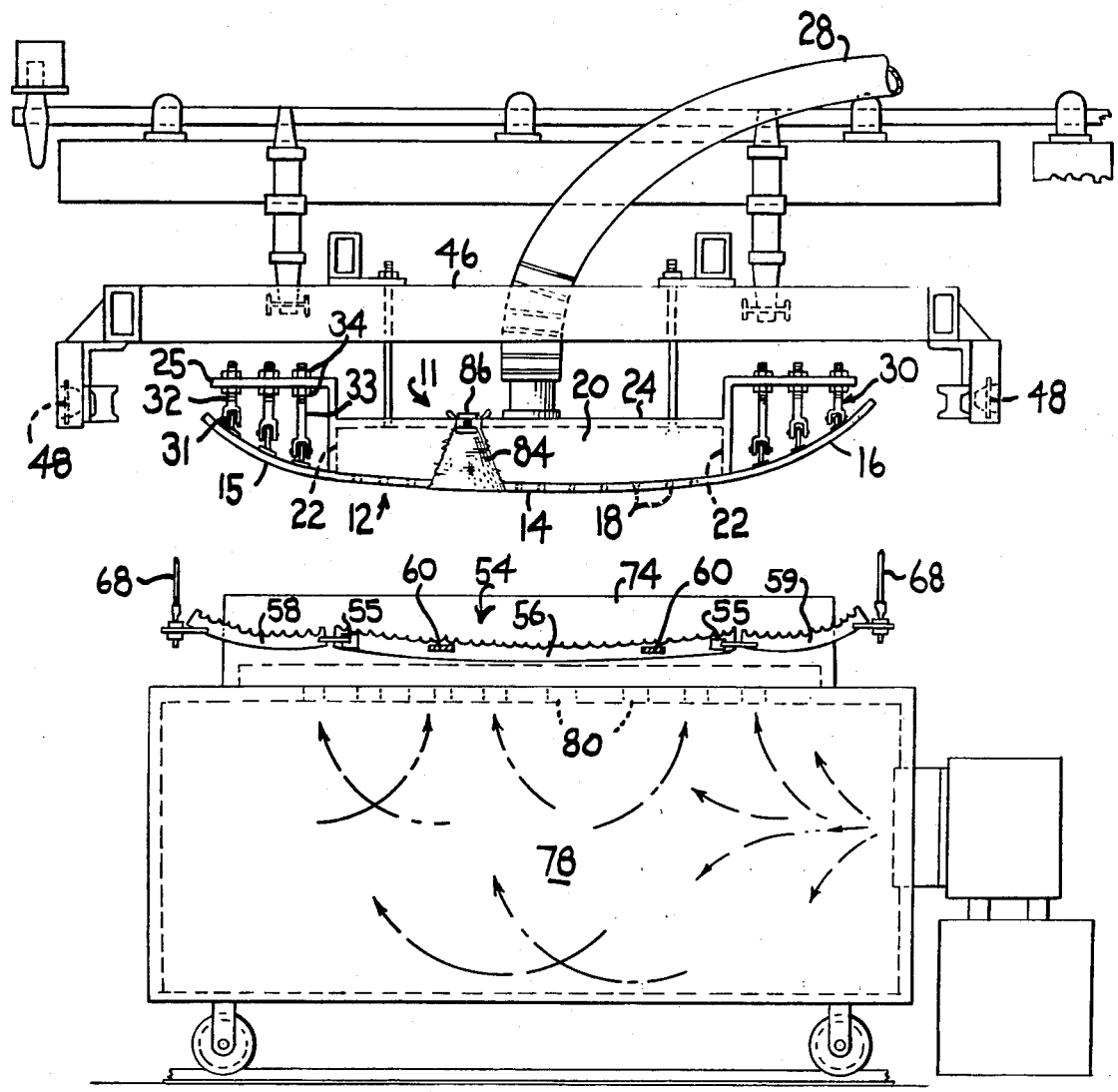
FIG. 1 is an elevational end view of a vacuum shaping station modified according to the present invention to produce glass sheets having wrap-around shapes suitable for automobile backlights and comprising a main region of relatively shallow curvature flanked by sharply bent end regions, with certain parts omitted for clarity.

Referring to the drawings, apparatus constructed according to the present invention comprises a modified vacuum mold 11 having an outwardly facing curved shaping wall 12. The latter has a main portion 14 of relatively shallow curvature disposed centrally of the length of the curved shaping wall and longitudinal end portions 15 and 16 that are sharply bent relative to the main portion 14. The different portions of the shaping wall 14 are provided with shapes that conform to the shape to be applied to different regions of a heat softened glass sheet engaged thereby during a shaping operation.

Apertures 18 are provided throughout the extent of the main portion 14 only to provide air passages through the thickness of portion 14 into a vacuum chamber 20 disposed behind the apertured main portion 14. The vacuum chamber is defined by a pair of end walls 21 interconnected by a pair of side walls 22 extending rearwardly of the shaping wall 12 to a relatively rigid plate 24 that serves as the rear wall of vacuum chamber 20. Side walls 22 are located immediately inward of the sharply bent longitudinal end portions 15 and 16 of the shaping wall 12. The end walls 21 also extend along the sides of the main portion 14 of the shaping wall 12 of the relatively rigid plate 24 to enclose the vacuum chamber 20.

The rigid plate 24 is apertured to receive a vacuum supply hose 28 that extends to a vacuum pump (not shown). When the vacuum pump is operated, aid is exhausted through the apertures 18 and the vacuum chamber 20 to suck a heat softened glass sheet into conformity with the lower surface of the main portion 14 of the shaping wall 12.

The relatively rigid plate 24 has longitudinal extensions 25 and 26 that extend beyond the side walls 22 in spaced relation behind each of the longitudinal end portions 15 and 16 of relatively sharp curvature, respectively. Each of the longitudinal end portions has a series of spaced connecting members 30 adjustable in length that interconnect spaced localized portions of each sharply bent end portion 15 and 16 to corresponding longitudinal extensions 25 or 26 of rigid plate 24.

The end portions 15 and 16 of shaping wall 12 are free from reinforcement except for said spaced connecting members 30. Therefore, since the shaping wall 12 is thinner than said relatively rigid plate 24, whenever the length of any connecting member 30 is adjusted, the shape of the localized portion of the end portion 15 or 16 of the shaping wall 12 is adjusted locally without distorting the corresponding extensions 25 or 26 of the relatively rigid plate 24. Hence, the latter serves as relatively rigid reinforcing means connected to the shaping wall.

Each of the spaced connecting members that interconnect a longitudinal end portion 15 or 16 of the shaping wall 12 with the relatively rigid plate 24 is preferably of the type disclosed in FIGS. 4 and 6 through 9 of U.S. Pat. No. 3,367,764 of Samuel L. Seymour, and comprises a first connecting member 31 rigidly connected to the inside surface of a longitudinal end portion 15 or 16 of the shaping wall 12 and having a slotted free end portion. In addition, each spaced connecting member 30 comprises a second connecting member 32 having an externally threaded portion 33 received by adjustment nuts 34 disposed on opposite sides of the rigid reinforcing plate 24 is threaded engagement with the externally threaded portion 33 of the second connecting member 32. The connecting member 32 carries a pin at its free end that engages the slot of the slotted end portion of member 31. This causes members 31 and 32 to be pivotally interconnected at their adjacent ends to form a joint having limited freedom to pivot. Thus, it is readily seen that loosening and tightening the adjustment nuts 34 on the externally threaded portion 33 of member 32 causes the associated connecting member 30 to move in and out with respect to the relatively rigid plate 24, thereby causing local variation in the shape of the corresponding end portion 15 or 16 of shaping wall 12.

While means is provided for enclosing the vacuum chamber 20 on all sides, the longitudinal end portions 15 and 16 of the shaping wall 12 are provided with a peripheral portion free from reinforcement except for said shaped connecting members 30, which interconnect the longitudinal end portions 15 and 16 of the shaping wall 12 with the corresponding extensions 25 and 26 of the relatively rigid plate 24. This construction facilitates adjustment of the shape of the sharply bent end portions 15 and 16 when such adjustment is needed. The open portion of the end portions 15 and 16 permits ready access of a tool to adjust the length of any of the spaced connecting members 30 when adjustments are necessary.

The modified vacuum mold 11 is connected to a support structure 46. The latter is pivoted about pivots 48 in response to actuation of a piston assembly 50 operating through a bell crank 52.

Figure 3:
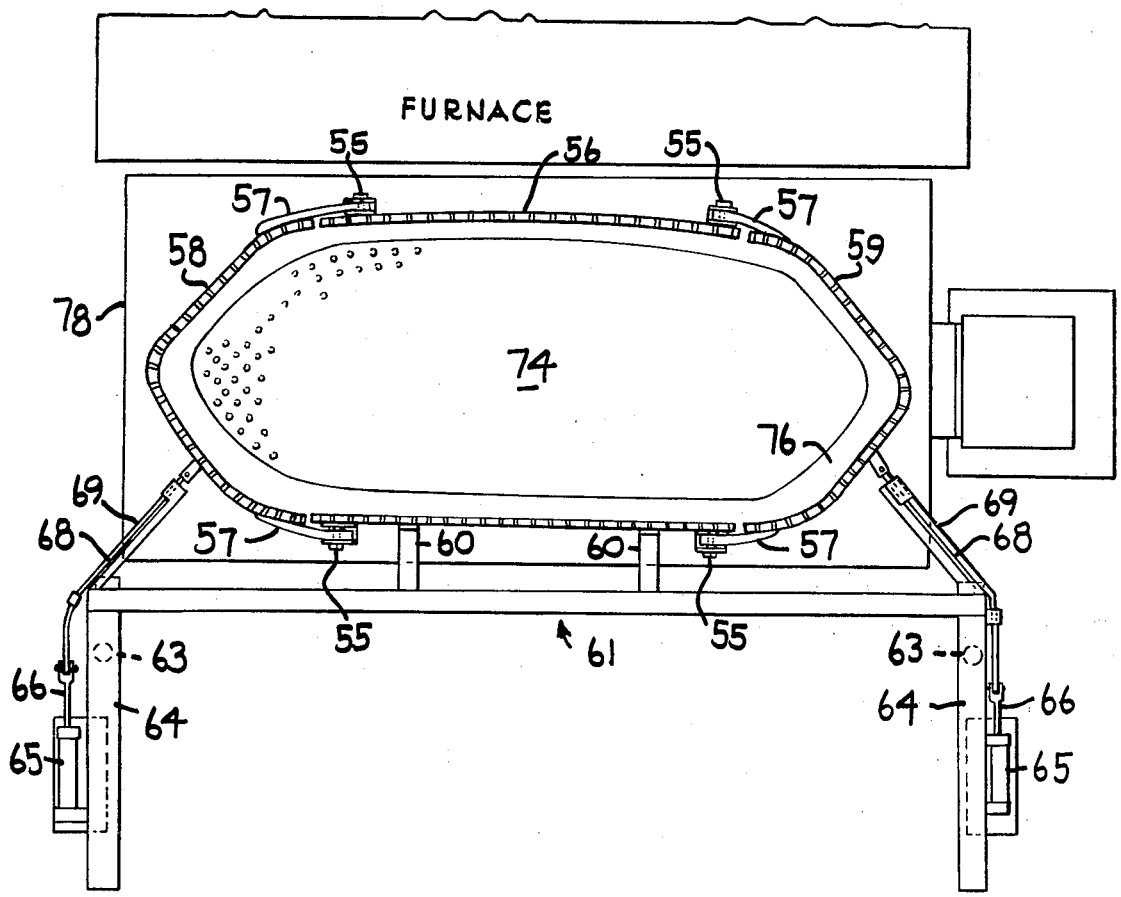
FIG. 3 is a plan view of a portion of the apparatus taken along the lines III—III of FIG. 2.

While the apparatus depicted thus far represents a novel vacuum type mold, it is usually used in combination with a ring-type mold shown generally at 54 disposed below the position occupied by said modified vacuum mold 11. The ring-type mold comprises a main mold section 56 of relatively shallow curvature (FIG. 3) and sharply bent end sections 58 and 59 pivotally connected in end to end relation to the main or center mold section 56. The pivotal connection comprises four hinge rods 55 connected to the main mold section 56 and a pair of outriggers 57 rigidly attached at their outer ends to one or the other end sections 58 or 59 and pivotally attached to adjacent hinge rods 55 at their inner ends.

The main mold section 56 comprises a pair of longitudinal extending shaping rails, each having a serrated upper edge surface defining a relatively shallow curvature conforming to the region of shallow curvature to be imparted to the bent glass sheet along its longitudinal side edges. The rails are also provided with notches (not shown) to permit retractable fingers to lift the bent glass sheet off the mold for further processing in a manner well known in the art. The end sections 58 and 58 each comprise a continuous rail conforming generally to the outline of the sharply bent end region of the bent glass sheet.

The center mold section 56 is rigidly connected to a pair of support members 60 which, in turn, are connected to a vertically displaceable frame-type support 61 over a horizontally movable carriage 62 through a pair of simultaneously actuated vertical pistons 63. The support 61 includes a pair of horizontal arms 64 each carrying a horizontal piston cylinder 65 provided with a piston rod 66. The latter is attached through a turnbuckle-type length adjustable means 67 to a flexible cable 68. A cantilever structure 69 extending from each arm 64 supports a series of pulleys 70 about which flexible cable 68 is entrained. The free end of each flexible cable 68 not connected to the piston rod 66 is connected to an end section 58 or 59 or the ring-type mold 54.

From the above description, it is evident that vertical pistons 63 actuate the raising and lowering of the frame-type support 61 and its attached ring-type mold 54. It is also evident that pistons 65, when actuated lift end mold sections 58 and 59 to close the mold 54, thus providing a continuous peripheral shaping surface conforming to the shape provided by the shaping wall 12, or allow the end sections to lower to an open mold piston.

A ceramic bed 74 has an endless recess 76 in its upper portion for receiving said ring-type mold 54. The ceramic bed is porous and is superimposed over a gas supply chamber 78 through a series of communicating passageway 80. The ceramic bed 74 forms an extension of a gas hearth over which glass sheets are conveyed through a furnace while being heated to a glass deformation temperature.

Referring now to FIGS. 4 through 7, a typical bending sequence will be described.

In FIG. 4, a glass sheet G is shown in position above the ceramic bed 74. The modified vacuum mold 11 is disposed over the glass sheet in its lowered position with the vacuum supply hose 28 open, and the open ring-type mold 54 is located within the continuous recess 76 of the ceramic bed 74. The end sections 58 and 59 of the ring-type mold 54 are in their open position.

In FIG. 5, the vertical pistons 63 have actuated vertical movement upward of the frame-type support 61 and the ring-type mold 54. Each of the horizontal pistons 65 has been actuated to cause the end mold sections 58 and 59 to begin to close. The heat softened glass sheet has begun to sag to conform to the outline shape of the main mold section 56.

Figure 6:
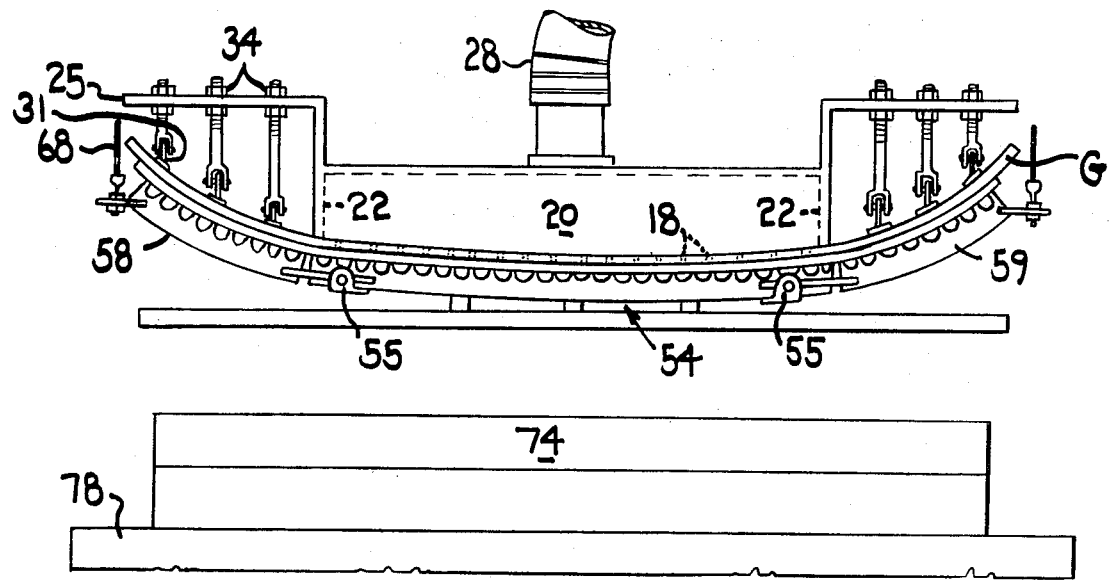

In FIG. 6, the modified vacuum mold 11 is in contact with the entire upper surface of the glass sheet, vacuum is being applied through vacuum chamber 20 and the apertures 18 in the main portion 14 of the shaping wall 12. The ring-type mold 54 has had its end sections 58 and 59 completely closed so that the ring-type mold 54 engages the peripheral portion of the under surface of the glass sheet G a small fraction of an inch inside the glass edge. It will be seen from FIG. 6 that the vacuum is applied only to the relatively gently bent glass region of the glass sheet that engages the portion of shallow curvature of the apertured main portion 14 of the outward facing shaping wall 12, whereas the sharply bent end regions of the glass sheet, which needs no suction to prevent cross sag, engage the sharply bent end portions 15 and 16 of shaping wall 12 and end sections 58 and 59 of the ring-type mold 54.

Figure 7:
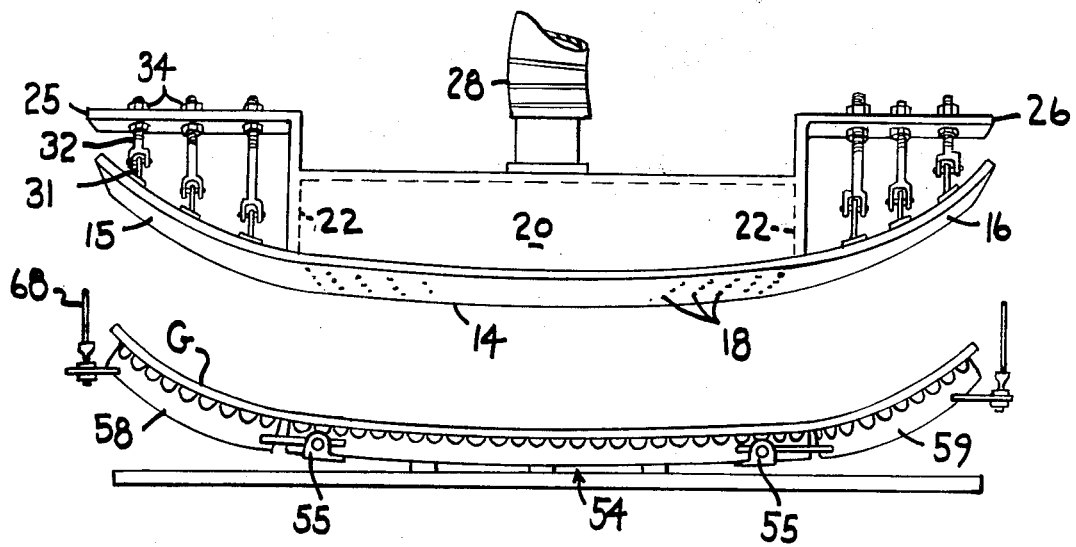
Figure 8:
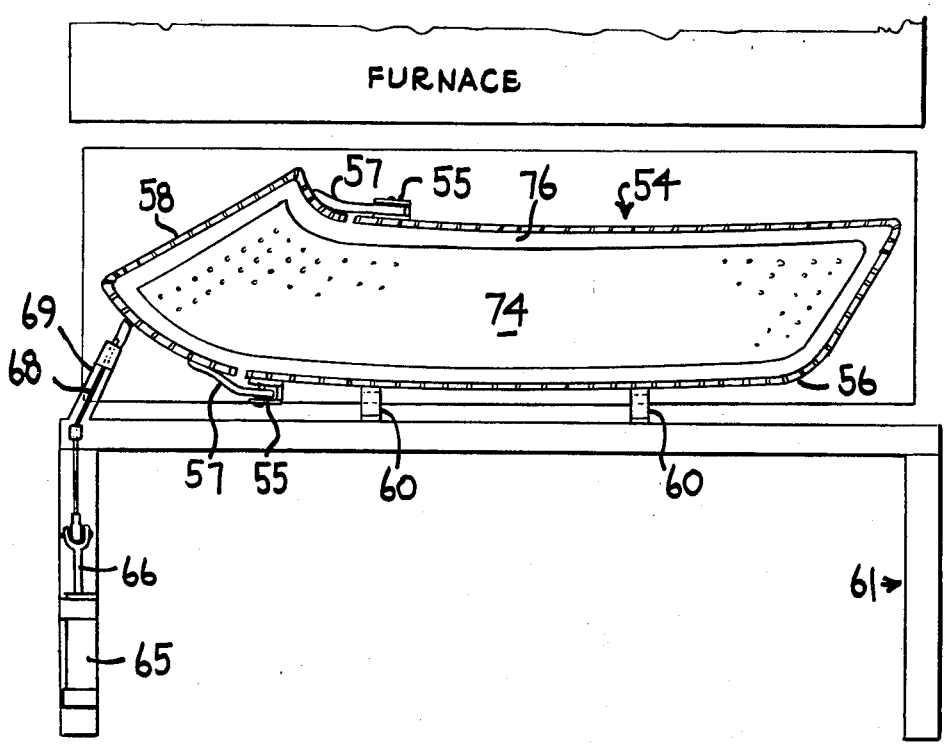
FIG. 8 is a view similar to FIG. 3 of an alternate embodiment of the present invention especially adapted to produce J-bends in glass sheets to fabricate rear-quarter lights.

After the shape is impressed on the glass sheet in the manner described above, the glass rests on the closed ring-type mold 54 while the modified vacuum mold 11 is pivoted upward about pivots 48 out of engagement with the upper surface of the glass sheet G. The bent glass sheet is removed from contact with mold 11 by lowering the outline mold 54 as depicted in FIG. 7. The glass sheet is then transferred to a cooling station where it is rapidly chilled to impart at least a partial temper to the glass. The ring-type mold 54 is then opened by relaxing horizontal pistons 65 to lower end sections 58 and 59 and the open mold 54 is lowered into the continuous recess 76 of the ceramic bed 74. The modified vacuum mold 11 is actuated by piston 50 to resume its downward pivoted orientation depicted in FIG. 4 to await the arrival of a succeeding glass sheet.

The usual limit switches and interlocks are used to control the operation of timer circuits in a manner well known in the art. The particular electrical control circuitry forms no part of the present invention.

In a particular embodiment of the present invention, the shaping wall 12 suitable for shaping glass sheets up to thicknesses of a quarter inch comprises a quarter inch thick plate of hot rolled steel. The relatively rigid metal plate 24 is formed of half inch thick cold rolled No. 1018 carbon steel.

The modified vacuum mold 11 is provided with a cover 84 in direct contact with the shaping surface. The cover 84 is preferably of a material that does not harm glass at elevated temperatures, for example, a stretchable knit fabric of glass cloth composed of texturized yarn such as depicted in U.S. Pat. No. 3,148,968 to James H. Cypher and Clement E. Valchar. A number of closely spaced clamps 36 is mounted around the periphery of the relatively rigid metal plate 24 to clamp the cover 84 in position where it is in an unwrinkled condition against the outward facing shaping wall 12.

Figure 2:
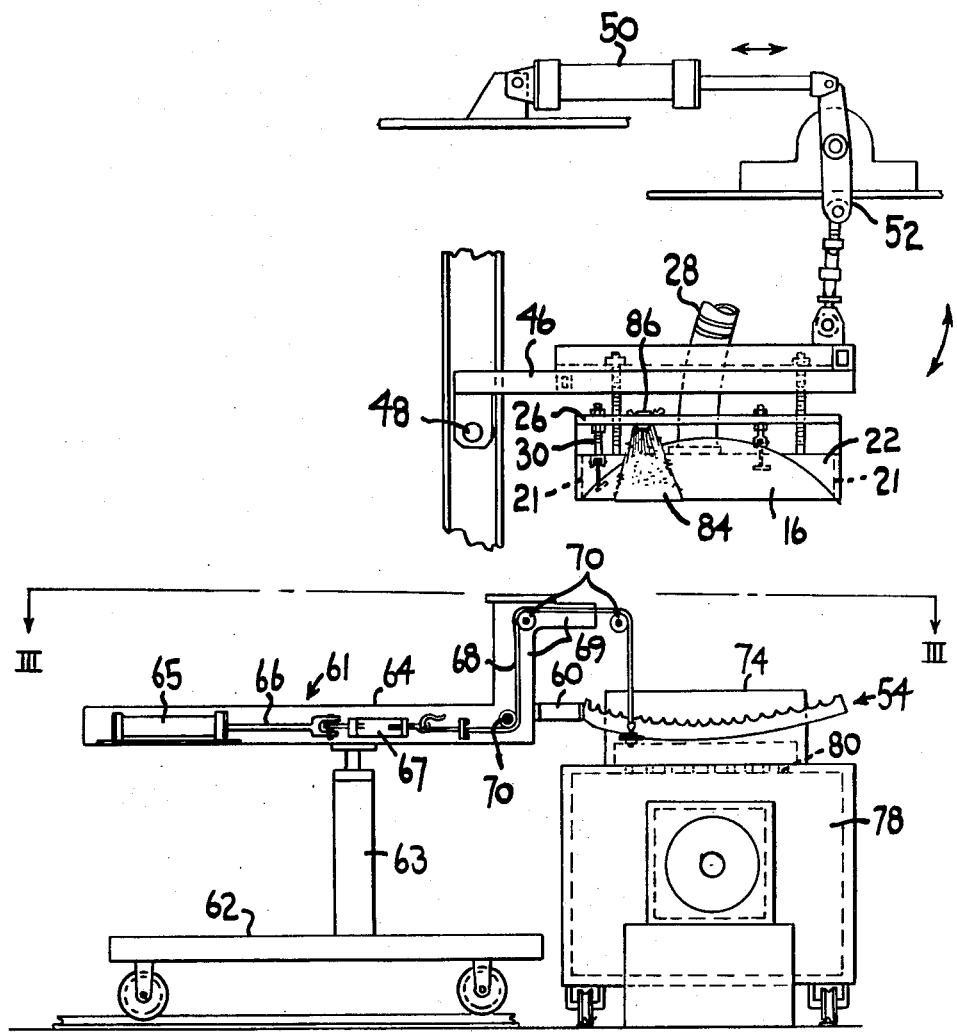
FIG. 2 is a side elevation of the structure shown in FIG. 1 taken at right angles to the view of FIG. 1.

The embodiment described above is capable of forming so called wrap around shapes. The embodiment depicted in FIG. 8 produces a so called J-bend in which only one end region of a glass sheet is sharply bent relative to a main portion of shallow curvature. In the FIG. 8 embodiment, the shaping wall 12 of the modified vacuum mold 11 has one of the longitudinal end portions 16 omitted. In addition, the ring-type mold 54 has one of its sharply bent end sections 59 omitted. All the structure associated with the omitted parts is also omitted from the FIG. 8 embodiment. Otherwise, the FIG. 8 embodiment is substantially identical to the embodiment depicted in FIGS. 1 to 3, having only one end section 58 actuated through a single horizontal piston 65 and a single flexible cable 68.

The form of the invention shown and described in this disclosure represents an illustrative preferred embodiment and a modification thereof. It is understood that various changes may be made without departing from the spirit of the invention as recited in the claimed subject matter that follows.

What is claimed is:
1. Apparatus for bending a glass sheet into a shape having at least one sharply bent region and a region of shallow curvature comprising:
   (a) a mold having an outwardly facing shaping wall having a sharply bent portion and a portion of shallow curvature conforming to the shape desired for said glass sheet after bending.
   (b) a vacuum chamber behind the portion of said wall defining said region of shallow curvature,
   (c) apertures in the portion of said shaping wall forming part of said vacuum chamber,
   (d) a vacuum source communicating with said vacuum chamber, whereby said vacuum chamber may be provided with subatmospheric pressure through said apertures,
   (e) relatively rigid reinforcing means connected to said wall,
   (f) said sharply bent portion being more rigid than a heated glass sheet and more flexible than said rigid reinforcing means,
   (g) and spaced connecting members adjustable in length interconnecting spaced localized portions of said sharply bent portion of said shaping wall to said rigid reinforcing means, whereby adjusting the length of each said connecting members adjusts the shape of its said interconnected portion of said sharply bent shaping wall.

2. Apparatus as in claim 1, wherein said sharply bent portion is located adjacent to a longitudinal extremity of said shaping wall, and is provided with a peripheral portion free from reinforcement except for said spaced connecting members to facilitate adjustment of the shape of said sharply bent portion when needed.

3. Apparatus as in claim 1, wherein said outwardly facing shaping wall has a centrally disposed portion of shallow curvature flanked at each longitudinal extremity thereof by a sharply bent portion and said vacuum chamber comprises a pair of walls extending rearward from said shaping wall longitudinally inward of each of said sharply bent portions to confine said vacuum chamber to said portion of shallow curvature only, each said sharply bent portion being provided with a peripheral portion free from reinforcement except for said spaced connecting members to facilitate adjustment of the shape of said sharply bent portions when needed.

4. Apparatus as in claim 1, wherein said shaping wall faces downward.

5. Apparatus as in claim 4, further including a ring-type mold disposed below said downward facing shaping mold, and means associated with at least one of said molds to provide relative vertical movement to at least one of said molds between a retracted position wherein said ring-type mold is spaced from said mold having said downward facing shaping wall and a glass engaging position wherein said molds engage the opposite surfaces of a heat softened glass sheet disposed between said molds.

6. Apparatus as in claim 5 wherein said ring-type mold comprises a jointed shaping ring.

7. Apparatus as in claim 2, wherein said shaping wall faces downward.

8. Apparatus as in claim 7, further including a jointed ring-type mold having a sharply bent end section pivotally connected to a main section of shallow curvature in end to end relation,
   means associated with at least one of said molds to provide relative vertical movement to at least one of said molds between a retracted position wherein said ring-type mold is spaced from said mold having said downward facing shaping wall and a glass engaging position wherein said molds engage the opposite surfaces of a heat softened glass sheet disposed between said molds, and
   means associated with said end section of said jointed mold to pivot said end section between an open mold position when said molds occupy said retracted position and a closed mold position when said molds occupy said glass engaging position.

9. Apparatus as in claim 3, wherein said shaping wall faces downward.

10. Apparatus as in claim 9, further including a jointed ring-type mold having a main section of shallow curvature and pivoted end sections of relatively sharp curvature disposed in end to end relation,
   means associated with at least one of said molds to provide relative vertical movement to at least one of said molds between a retracted position wherein said ring-type mold is spaced from said mold having said downward facing shaping wall and a glass engaging position wherein said molds engage the opposite surfaces of a heat softened glass sheet disposed between said molds, and
   means associated with each of said end sections of said jointed mold to pivot its said associated end section between an open mold position when said molds occupy said retracted position and a closed mold position when said molds occupy said glass engaging position.

References Cited
UNITED STATES PATENTS

| | | | |
|---|---|---|---|
| 2,817,928 | 12/1957 | Lambert et al. | 65—106 |
| 3,004,295 | 10/1961 | Bottoms et al. | 65—106 X |
| 3,251,672 | 5/1966 | Touvay et al. | 65—291 |
| 3,421,875 | 1/1969 | Kirkman | 65—106 X |
| 3,455,672 | 7/1969 | Dompkowski | 65—106 X |
| 3,477,839 | 11/1969 | Misson | 65—107 X |
| 3,586,492 | 6/1971 | McMaster | 65—273 |

ARTHUR D. KELLOGG, Primary Examiner

U.S. Cl. X.R.

65—275, 291